(12) United States Patent
Xie

(10) Patent No.: US 9,746,717 B2
(45) Date of Patent: Aug. 29, 2017

(54) CURVED LIQUID CRYSTAL DISPLAY MODULE AND LIQUID CRYSTAL DISPLAY DEVICE USING THE SAME

(71) Applicant: Wuhan China Star Optoelectronics Technology Co., Ltd., Wuhan, Hubei (CN)

(72) Inventor: Chang Xie, Guangdong (CN)

(73) Assignee: Wuhan China Star Optoelectronics Technology Co., Ltd, Wuhan, Hubei (CN)

(*) Notice: Subject to any disclaimer, the term of this patent is extended or adjusted under 35 U.S.C. 154(b) by 204 days.

(21) Appl. No.: 14/655,402

(22) PCT Filed: May 25, 2015

(86) PCT No.: PCT/CN2015/079654
§ 371 (c)(1),
(2) Date: Jun. 25, 2015

(87) PCT Pub. No.: WO2016/183857
PCT Pub. Date: Nov. 24, 2016

(65) Prior Publication Data
US 2017/0146842 A1 May 25, 2017

(30) Foreign Application Priority Data
May 19, 2015 (CN) .......................... 2015 1 0259795

(51) Int. Cl.
*G02F 1/1339* (2006.01)
*G02F 1/1335* (2006.01)

(52) U.S. Cl.
CPC .... *G02F 1/13394* (2013.01); *G02F 1/133514* (2013.01); *G02F 2001/13396* (2013.01); *G02F 2001/13398* (2013.01); *G02F 2201/56* (2013.01)

(58) Field of Classification Search
CPC ...... G02F 1/1333; G02F 1/1335; G02F 1/136; G02F 1/13394; G02F 1/1339;
(Continued)

(56) References Cited

U.S. PATENT DOCUMENTS 5,273,475 A * 12/1993 Oshikawa ......... G02F 1/133305
156/163
2014/0092350 A1* 4/2014 Byeon .................. G02F 1/1339
349/106
2016/0231607 A1* 8/2016 Wu ....................... G02F 1/1339

* cited by examiner

*Primary Examiner* — Thoi Duong
(74) *Attorney, Agent, or Firm* — Andrew C. Cheng

(57) ABSTRACT

The present invention provides a curved liquid crystal display module and a liquid crystal display device. The curved liquid crystal display module includes a color filter substrate, an array substrate, and multiple isolation-cushion parts disposed between the color filter substrate and the array substrate. Wherein, the multiple isolation-cushion parts are densely distributed near a center position of the color filter substrate and the array substrate, and the multiple isolation-cushion parts are gradually sparsely distributed toward two edges. Through disposing the isolation-cushion parts to be densely distributed and strip-shaped at the center position, and to be sparsely distributed and dotted toward two edges, the device of the present invention is well suitable for different sustained force at different assembly locations of curved screen such that the curved liquid crystal display module can have a better display effect and an uniform thickness.

12 Claims, 1 Drawing Sheet

(58) Field of Classification Search
CPC ......... G02F 1/133305; G02F 1/133514; G02F 1/1368; G02F 1/1362; G02F 1/161; G02F 1/0107; G02F 1/13; G02F 2001/13396; G02G 2001/13396; G02G 2001/133388; G02G 2001/13398; H01L 2251/5338; H01L 27/3244; H01L 31/03926
USPC .......... 349/155, 153, 43, 106, 156, 158, 190
See application file for complete search history.

CURVED LIQUID CRYSTAL DISPLAY MODULE AND LIQUID CRYSTAL DISPLAY DEVICE USING THE SAME

BACKGROUND OF THE INVENTION

1. Field of the Invention

The present invention relates to a liquid crystal display technology field, and more particularly to a curved liquid crystal display module and a liquid crystal display device using the same.

2. Description of Related Art

With the evolution of optical and semiconductor technology, the flat panel display is also significantly developed. In recent years, the major manufacturers have launched curved display devices. Overall speaking, the curved display can provide a best viewing effect from a center position to an edge position. On the contrary, a normal flat display does not have a good display effect at an edge position of the display device. An entire display screen of the curved display device appears an arcuate and surrounded design toward a user direction so as to provide a wide and panoramic image effect. Whether in the center position of the screen or the four edges of the screen, the curved display can bring the same visual experience. Besides, when viewing the curved display device at a short distance, the image distortion is reduced. Furthermore, the curved display device can make the viewing distance of the user to be elongated in order to achieve a better viewing experience. Compared to the conventional flat-panel display, the curved display device has great advantages, for example: 1. brand differentiation; 2. wider viewing angle; 3. reducing the distortion at a short viewing distance. Therefore, the curved liquid crystal display device will become more and more popular.

However, in the assembly process of a curved screen of a liquid crystal display device, because sustained forces at different assembly positions of the curved screen are different, if isolation-cushion parts are not well disposed, the display effect and the entire thickness of the curved display device are affected. Accordingly, the isolation and cushion problem is a problem has to be solved.

SUMMARY OF THE INVENTION

The embodiment of the present invention provides a curved liquid crystal display module and a liquid crystal display in order to solve a bad display effect and uneven thickness of a curved liquid crystal display device because of improper design of isolation-cushion parts.

In order to solve the above problems, an embodiment of the present invention provides: a curved liquid crystal display module, comprising: a color filter substrate; an array substrate; and multiple isolation-cushion parts disposed between the color filter substrate and the array substrate; wherein, the multiple isolation-cushion parts are densely distributed near a center position of the color filter substrate and the array substrate, and the multiple isolation-cushion parts are gradually sparsely distributed toward two edges.

Wherein, the multiple isolation-cushion parts are different in shape.

Wherein, surface shapes of the multiple isolation-cushion parts are gradually decreased from the center position to the two edges.

Wherein, the multiple isolation-cushion parts located at the center position of the color filter substrate and the array substrate are strip-shaped, and the multiple isolation-cushion parts located at the two edges are dotted.

Wherein, each isolation-cushion part is made of an elastic material.

Wherein, each isolation-cushion part is a resin or a glass.

Wherein, heights of the multiple isolation-cushion parts along a direction perpendicular to a plane of the color filter substrate or the array substrate are the same.

Wherein, the curved liquid crystal display module further includes a case, and the color filter substrate, the array substrate and the multiple isolation-cushion parts are disposed inside the case.

In order to solve the above technology problems, the present invention also provides a liquid crystal display device, and the liquid crystal display device includes the curved liquid crystal display module described at above embodiment.

Comparing to the conventional art, the curved liquid crystal display module and the liquid crystal display device of the present invention, through disposing the isolation-cushion parts to be densely distributed and strip-shaped at the center, and to be sparsely distributed and dotted toward two edges, the device of the present invention is well suitable for different sustained force at different assembly locations of curved screen such that the curved liquid crystal display module can have a better display effect and an uniform thickness.

BRIEF DESCRIPTION OF THE DRAWINGS

In order to more clearly illustrate the technical solution in the present invention or in the prior art, the following will illustrate the figures used for describing the embodiments or the prior art. It is obvious that the following figures are only some embodiments of the present invention. For the person of ordinary skill in the art without creative effort, it can also obtain other figures according to these figures. In the figures.

DETAILED DESCRIPTION OF THE PREFERRED EMBODIMENT

The following content combines figures and embodiments for detail description of the present invention.

Figure 1:
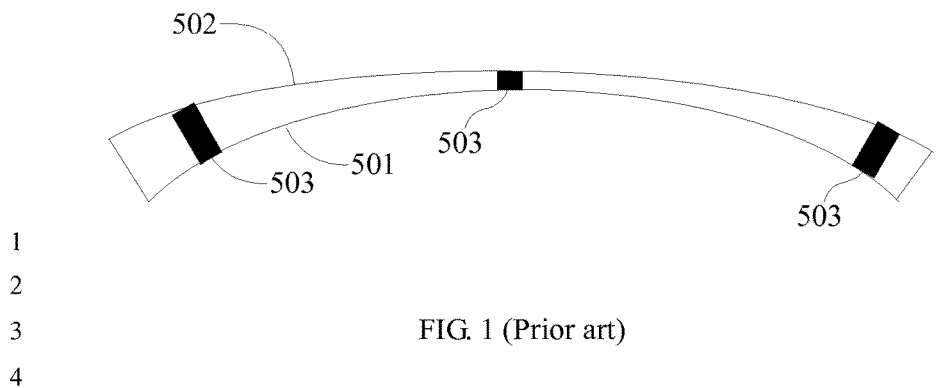
FIG. 1 is a schematic diagram of a curved liquid crystal display device according to the conventional art.

With reference to FIG. 1, FIG. 1 is a schematic diagram of a curved liquid crystal display device according to the conventional art. From FIG. 1, in the conventional art, thicknesses of different regions of a liquid crystal cell of a curved liquid crystal display panel are different. In a curved liquid crystal display device, for a flexible liquid crystal display device, when a flexible liquid crystal display panel is bent, sustained forces at a center position and two edges are different. Areas which are far away from the center position of the curved surface sustain smaller stresses.

Therefore, if still utilizing multiple even distributed, same size and height isolation-cushion parts 503 on a color filter substrate 502 to maintain a cell thickness (with an array substrate 501), because the sustained force at the center position of the curved surface is the greatest, the deformation of the isolation-cushion part 503 at the center position is also the largest such that the cell thickness at the center position is smallest, and the cell thickness is gradually increased according to positions far away from the center position of the curved surface. Accordingly, the uniformity and consistency of the cell thickness when the liquid crystal display panel is bent is greatly decreased so as to affect a normal display of the curved liquid crystal display device. Therefore, a new design for the isolation-cushion parts suitable for the curved liquid crystal display panel and the curved liquid crystal display device is required in order to solve the above problems.

Figure 2:
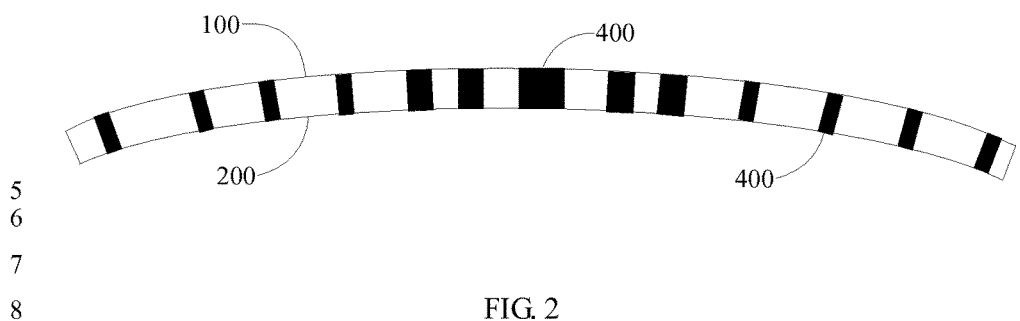
FIG. 2 is a schematic cross-sectional view of a curved liquid crystal display module according to a preferred embodiment of the present invention.
Figure 3:
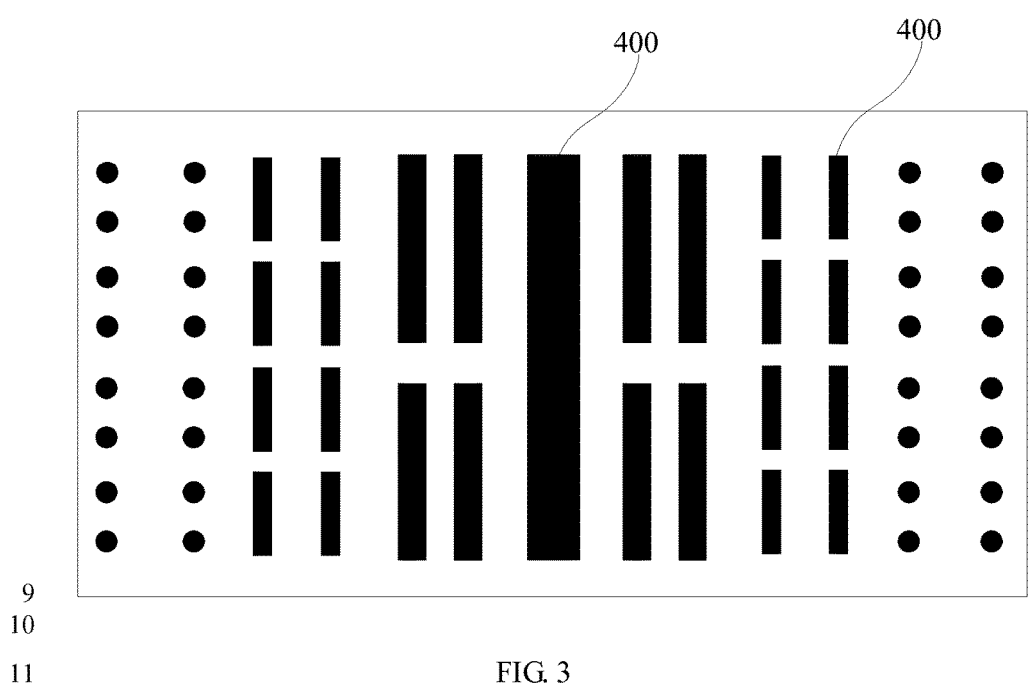
FIG. 3 is a schematic arrangement diagram of isolation-cushion parts in the embodiment shown in FIG. 2.

In order to solve the above technology problems, the present invention provides a curved liquid crystal display module. With also reference to FIG. 2 and FIG. 3, FIG. 2 is a schematic cross-sectional view of a curved liquid crystal display module according to a preferred embodiment of the present invention and FIG. 3 is schematic arrangement diagram of isolation-cushion parts in the embodiment shown in FIG. 2. The curved liquid crystal display module includes: a color filter substrate 100, an array substrate 200, and multiple isolation-cushion parts 400 disposed between the color filter substrate 100 and the array substrate 200.

Specifically, the isolation-cushion parts 400 are used to separate the color filter substrate 100 from the array substrate 200. Wherein, the isolation-cushion parts 400 disposed between the color filter substrate 100 and the array substrate 200 are different in shape. Preferably, an arrangement of the isolation-cushion parts 400 are densely distributed at a center position of the color filter substrate 100 and the array substrate 200 and are sparsely distributed at two edges. Besides, the isolation-cushion parts 400 located at the center position of the color filter substrate 100 and the array substrate 200 are strip-shaped, and the isolation-cushion parts 400 located at the two edges of the color filter substrate 100 and the array substrate 200 are dotted.

The design purpose is that surface shapes or areas of the isolation-cushion parts 400 are gradually decreased from the center position to the two edges. Of course, the surface shapes of the isolation-cushion parts 400 are not limited to be strip-shaped and dotted. The requirement is that the surface areas of the isolation-cushion parts 400 located the center position are greater than areas of the isolation-cushion parts 400 located at the two edges, that is, the surface areas of the isolation-cushion parts 400 are decreased from the center position to the two edges of the color filter substrate 100 and the array substrate 200.

Each of the isolation-cushion parts 400 is made of an elastic material such as a resin or a glass and so on in order to have a good shockproof effect. Besides, heights of the isolation-cushion parts 400 along a direction which is perpendicular to a plane of the color filter substrate 100 or the array substrate 200 are the same. Accordingly, an entire thickness of the liquid crystal display module is even and the same.

The structure of photo spacers (the isolation-cushion parts 400) of the curved liquid crystal display module is described above. Because the sustained force at the center position of the curved surface is the greatest, the deformation of the isolation-cushion parts 400 at the center position of the curved surface is also the greatest. Accordingly, the present invention provides strip-shaped isolation-cushion parts 400 at the center position of the curved surface, and columnar isolation-cushion parts 400 at the two edges of the curved surface. Besides, at a transition position between the center position and the two edges, isolation-cushion parts 400 which are gradually shortened and strip-shaped are provided.

The feature is that the contact area of the isolation-cushion parts 400 which are strip-shaped with the color filter substrate 100 and the array substrate 200 is larger so that the isolation-cushion parts 400 can sustain a larger stress. On the contrary, the contact area of the isolation-cushion parts 400 which are columnar with the color filter substrate 100 and the array substrate 200 is smaller so that the isolation-cushion parts 400 can only sustain a smaller stress. The isolation-cushion parts 400 of the present invention are densely or sparsely distributed, and the surface shapes are uneven. According to different sustained forces at different positions of the curved display module, the shapes of the isolation-cushion parts 400 (also known as the photo spacer) are different in order to improve the uniformity of the cell thickness of the curved display module so as to avoid the picture distortion and abnormal color display problems because of difference in the cell thickness.

Besides, the curved liquid crystal display module can also include a case (not shown). The color filter substrate 100, the array substrate 200 and the isolation-cushion parts 400 are disposed inside the case. The case can protect color filter substrate 100, the array substrate 200 and the isolation-cushion parts 400.

Comparing to the conventional art, the present invention provides a curved liquid crystal display module, and through disposing the isolation-cushion parts to be densely distributed and strip-shaped at the center, and to be sparsely distributed and dotted toward two edges, the device of the present invention is well suitable for different sustained forces at different assembly locations of curved screen such that the curved liquid crystal display module can have a better display effect and an uniform thickness.

Furthermore, the embodiment of the present invention also provides a liquid crystal display device. The liquid crystal display device includes a curved liquid crystal display module. The curved liquid crystal display module includes a color filter substrate, an array substrate and multiple isolation-cushion parts 400 disposed between the color filter substrate 100 and the array substrate 200.

Specifically, the isolation-cushion parts 400 are used to separate the color filter substrate 100 from the array substrate 200. Wherein, the isolation-cushion parts 400 disposed between the color filter substrate 100 and the array substrate 200 are different in shape. Preferably, an arrangement of the isolation-cushion parts 400 are densely distributed at a center position of the color filter substrate 100 and the array substrate 200 and are sparsely distributed at two edges. Besides, the isolation-cushion parts 400 located at the center position of the color filter substrate 100 and the array substrate 200 are strip-shaped, and the isolation-cushion parts 400 located at the two edges of the color filter substrate 100 and the array substrate 200 are dotted.

The design purpose is that surface shapes or areas of the isolation-cushion parts 400 are gradually decreased from the center position to the two edges. Of course, the surface shapes of the isolation-cushion parts 400 are not limited to be strip-shaped and dotted. The requirement is that the surface areas of the isolation-cushion parts 400 located the center position are greater than areas of the isolation-cushion parts 400 located at the two edges, that is, the surface areas of the isolation-cushion parts 400 are decreased from the center position to the two edges of the color filter substrate 100 and the array substrate 200.

Each of the isolation-cushion parts 400 is made of an elastic material such as a resin or a glass and so on in order to have a good shockproof effect. Besides, heights of the isolation-cushion parts 400 along a direction which is perpendicular to a plane of the color filter substrate 100 or the array substrate 200 are the same. Accordingly, an entire thickness of the liquid crystal display module is even and the same.

The structure of photo spacers (the isolation-cushion parts 400) of the curved liquid crystal display module is described above. Because the sustained force at the center position of the curved surface is the greatest, the deformation of the isolation-cushion parts 400 at the center position of the curved surface is also the greatest. Accordingly, the present invention provides strip-shaped isolation-cushion parts 400 at the center position of the curved surface, and columnar isolation-cushion parts 400 at the two edges of the curved surface. Besides, at a transition position between the center position and the two edges, isolation-cushion parts 400 which are gradually shortened and strip-shaped are provided.

The feature is that the contact area of the isolation-cushion parts 400 which are strip-shaped with the color filter substrate 100 and the array substrate 200 is larger so that the isolation-cushion parts 400 can sustain a larger stress. On the contrary, the contact area of the isolation-cushion parts 400 which are columnar with the color filter substrate 100 and the array substrate 200 is smaller so that the isolation-cushion parts 400 can only sustain a smaller stress. The isolation-cushion parts 400 of the present invention are densely or sparsely distributed, and the surface shapes are uneven. According to different sustained forces at different positions of the curved display module, the shapes of the isolation-cushion parts 400 (also known as the photo spacer) are different in order to improve the uniformity of the cell thickness of the curved display module so as to avoid the picture distortion and abnormal color display problems because of difference in the cell thickness.

Besides, the curved liquid crystal display module can also include a case (not shown). The color filter substrate 100, the array substrate 200 and the isolation-cushion parts 400 are disposed inside the case. The case can protect color filter substrate 100, the array substrate 200 and the isolation-cushion parts 400.

Comparing to the conventional art, the liquid crystal display device of the present invention, through disposing the isolation-cushion parts to be densely distributed and strip-shaped at the center, and to be sparsely distributed and dotted toward two edges, the device of the present invention is well suitable for different sustained force at different assembly locations of curved screen such that the curved liquid crystal display module can have a better display effect and an uniform thickness.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:
1. A curved liquid crystal display module, comprising:
a color filter substrate;
an array substrate; and
multiple isolation-cushion parts disposed between the color filter substrate and the array substrate;
wherein, the multiple isolation-cushion parts are densely distributed near a center position of the color filter substrate and the array substrate, and the multiple isolation-cushion parts are gradually sparsely distributed toward two edges of the color filter substrate and the array substrate;
wherein, the multiple isolation-cushion parts are different in shape; and
wherein, the multiple isolation-cushion parts located at the center position of the color filter substrate and the array substrate are strip-shaped, and the multiple isolation-cushion parts located at the two edges are dotted.

2. The curved liquid crystal display module according to claim 1, wherein, surface shapes of the multiple isolation-cushion parts are gradually decreased from the center position to the two edges.

3. The curved liquid crystal display module according to claim 1, wherein, each isolation-cushion part is made of an elastic material.

4. The curved liquid crystal display module according to claim 3, wherein, each isolation-cushion part is a resin or a glass.

5. The curved liquid crystal display module according to claim 1, wherein, heights of the multiple isolation-cushion parts along a direction perpendicular to a plane of the color filter substrate or the array substrate are the same.

6. The curved liquid crystal display module according to claim 1, wherein, the curved liquid crystal display module further includes a case, and the color filter substrate, the array substrate and the multiple isolation-cushion parts are disposed inside the case.

7. A liquid crystal display device, comprising:
a curved liquid crystal display module, including:
a color filter substrate;
an array substrate; and
multiple isolation-cushion parts disposed between the color filter substrate and the array substrate;
wherein, the multiple isolation-cushion parts are densely distributed near a center position of the color filter substrate and the array substrate, and the multiple isolation-cushion parts are gradually sparsely distributed toward two edges of the color filter substrate and the array substrate;
wherein, the multiple isolation-cushion parts are different in shape; and
wherein, the multiple isolation-cushion parts located at the center position of the color filter substrate and the array substrate are strip-shaped, and the multiple isolation-cushion parts located at the two edges are dotted.

8. The liquid crystal display device according to claim 7, wherein, surface shapes of the multiple isolation-cushion parts are gradually decreased from the center position to the two edges.

9. The liquid crystal display device according to claim 7, wherein, each isolation-cushion part is made of an elastic material.

10. The liquid crystal display device according to claim 9, each isolation-cushion part is a resin or a glass.

11. The liquid crystal display device according to claim 7, wherein, heights of the multiple isolation-cushion parts along a direction perpendicular to a plane of the color filter substrate or the array substrate are the same.

12. The liquid crystal display device according to claim 7, wherein, the curved liquid crystal display module further includes a case, and the color filter substrate, the array substrate and the multiple isolation-cushion parts are disposed inside the case.

* * * * *